(12) United States Patent
Herring et al.

(10) Patent No.: US 6,373,262 B1
(45) Date of Patent: Apr. 16, 2002

(54) METHOD AND APPARATUS FOR TESTING A SIGNAL LINE

(75) Inventors: Jay R. Herring, Poughkeepsie; Joseph M. Hoke, Millerton; Robert R. Livolsi, Shokan, all of NY (US); Robert J. Lynch, Raleigh, NC (US); Steven Makow, Poughkeepsie; Andrew Z. Muszynski, Kingston, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/505,906

(22) Filed: Feb. 17, 2000

(51) Int. Cl.[7] ................................................ G01R 31/08
(52) U.S. Cl. ........................................ 324/647; 324/539
(58) Field of Search ................................ 324/539, 541, 324/647, 712, 76.82, 158.1

(56) References Cited

U.S. PATENT DOCUMENTS

| 4,782,300 A | 11/1988 | Bonaccio et al. | ........... 324/509 |
|---|---|---|---|
| 4,912,724 A | * 3/1990 | Wilson | ........................ 375/220 |
| 5,084,637 A | * 1/1992 | Gregor | ......................... 326/81 |
| 5,185,580 A | 2/1993 | Nichols, III et al. | ......... 324/539 |
| 5,250,908 A | 10/1993 | Liu et al. | ..................... 324/542 |
| 5,488,306 A | 1/1996 | Bonaccio | ..................... 324/539 |

OTHER PUBLICATIONS

"Failure–tolerant Self–Testing Driver/Receiver", L. Bailliet and C. Bustamante, IBM Technical Disclosure Bulletin, vol. 30, No. 3, Aug. 1987, pp. 1215–1220.

* cited by examiner

*Primary Examiner*—Safet Metjahic
*Assistant Examiner*—Vincent Q. Nguyen
(74) *Attorney, Agent, or Firm*—Lawrence D. Cutter; Floyd A. Gonzalez; Fleit, Kain, Gibbons, Gutman & Bongini P.L.

(57) ABSTRACT

A transmission line for carrying digital signals is provided with auxiliary line drivers at the receiver end, which are used in combination with the data line driver at the transmitting end to apply a sequence of sets of test voltages onto the line. The voltage resulting at the receiver input is used to detect open signal conductors and/or shorts in the receiver.

15 Claims, 2 Drawing Sheets

METHOD AND APPARATUS FOR TESTING A SIGNAL LINE

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

BACKGROUND OF THE INVENTION

1. Field of the Invention

This invention generally pertains to testing of signal transmission lines, and more particularly to the field of testing dual conductor transmission lines used in differential signaling.

2. Description of the Related Art

Progress in the field of computing and related to the Internet during the last decade has spurred increased interest in digital signaling technology and placed increased demands on the global telecommunications infrastructure. Some of the newer parts of the telecommunications infrastructure used for the Internet, such as transatlantic fiber optic cables are inherently digital. Older parts of the telecommunications infrastructure that must be used at present, such as the so called 'last mile' connection of individual homes to the public telephone system through twisted pairs, and cable TV distribution networks were designed as analog systems, and are now being adopted for digital use-for the Internet. Digital signaling through transmission lines originally intended for analog use, such as twisted pairs or coaxial cable places higher demands on the integrity of those systems. Imperfections that are tolerable for analog use are not acceptable for high baud rate digital use.

Differential signaling is a technique that can be used to transmit digital signals through dual conductor transmission lines such as twisted pairs of wires formerly used for audio bandwidth analog signals. Differential signaling, as opposed to using a single transmission wire referenced to ground separately at both ends, has the advantages that it is less prone to common mode noise, and variations in the ground potential (ground path noise) between the transmitting and receiving station.

One known scheme for differential signaling is where a transmitter applies a first voltage to a first line and a second voltage to a second line to transmit a logical zero signal. To transmit a logical one signal, the first voltage is placed on the second line and the second voltage is placed on the first line. At the receiver the voltages on the two lines are compared. The decode scheme could be such that if the voltage on the first line exceeds that on the second by a predetermined amount a binary one is construed, and in the opposite case, a binary zero is construed. The predetermined amount must be some finite amount such that noise level variations between the voltage on the two lines are not construed as signals.

A second known technique for differential signaling is one in which one wire is used to connected a ground voltage reference between the receiver and the transmitter, and a second wire carries a voltage which is set within one of two specified ranges to transmit either a binary zero or binary one.

The length of the physical line varies from one system to another, and there may be a number of interconnected physical lines which form the signal pathway in some systems. The varied length along with variation in the quality of the interconnection, i.e. ohmic losses, or impedance mismatches, lead to a variation in the signal voltage levels, and consequently the signal voltage difference, reaching the receiver. There is also some finite noise amplitude which is added to the signal. Accordingly receivers for decoding differential signal encoded binary data are designed to accept a certain range of voltage differences as representing a binary 1 and a range as representing binary 0. For a short link made of one unbroken run of wire, the voltage appearing at the receiver may be high, and conversely, for a long link having many interconnected wires the voltages may be low. The fact that there is a range of voltages that are interpreted as a binary 1 and a range interpreted as a binary 0 can result in a faulty line functioning normally under low noise condition but causing data errors in actual use. If due to a faulty connector or other reason, there is an open in one line, and if the system is not subject to common mode noise or ground path noise, then the system may still function normally, although the signal reaching the receiver would be near the lower end of the specified ranges. However in the case where a system with a fault is subject to common mode noise, propagating through the system from the receiver or the common mode noise on the signal line is present by induction from nearby signal lines or equipment, then the common mode signal will be stopped at the open in the wire and only propagate on the other signal wire, thus appearing at the receiver as a differential signal. Depending on its magnitude and polarity it may fall within one of the ranges corresponding to a binary one or binary zero, and corrupt the data stream. This kind of intermittent fault is difficult to detect and thus very problematic for manufactures of equipment that uses a large number of these type of data links. During the pre-shipment test of equipment, the equipment may not be subject to electromagnetic interference that would cause common mode noise and any open circuits such as discussed above would not cause erroneous signals until the equipment has been set up at an electrically noisy customer site.

At present transmission lines can be diagnosed by applying a signal generator to the one end of the transmission line and examining the signal received at the other end of the line with a signal. This requires a great deal of time spent by a skilled technician to set up each line for testing.

Accordingly, there is a need for a means to assuredly test for opens and shorts in the conductors that comprise the differential mode data links. It would be desirable to have a test circuit that is simple enough to be added to the signal receiver without excessively increasing the cost. Such a test circuit must be designed in such a way that it does not degrade the performance i.e. bandwidth of the data link.

SUMMARY OF THE INVENTION

According to one aspect of the invention an auxiliary line driver applies first test signals to a receiver end of a transmission line, a data transmitting line driver applies second test signals at a transmitting end of the transmission line, and a receiver amplifier-comparator at the receive end is used to read a voltage resulting at the receiver inputs from the interaction of the first and second test signals with the impedances of the transmission line impedances, the line driver output impedances and the impedance of a terminating resistor, the voltage being interpretable according to the teachings set forth hereinafter to indicate the presence of shorts or opens in the transmission line.

According to a further aspect of the invention a two conductor signal line is provided with a line driver at a first end, a receiver amplifier at a second end, and a test circuit at the second end, the test circuit comprising, a test signal input, a first buffer adopted to receive a test signal at a first input pin, and to drive a first conductor of the two conductor signal line from the second end, based on the input test signal, an inverter adopted to receive the test signal, and output an inverted test signal to a second buffer, the second buffer driving a second conductor of the two conductor line from the second end, whereby a binary one or zero test signal can be applied to the test signal input to cause the test circuit to drive one of the two conductors high and the other low depending on the logical value of the test signal.

According to a further aspect of the invention the buffers are of the three state logic type the outputs of which can be put set to an open state during normal use of the data link so as not to interfere with the normal data flow.

According to a further aspect of the invention the auxiliary signal driver, when the outputs are not set open, are characterized by an output impedance that is high relative to ohmic conduction loss impedance (DC impedance) of the transmission line.

According to another aspect of the invention the above described circuit is used in the following manner. A first test signal is applied to the line driver to cause it to apply a first set of prescribed signals to the first and second conductors at the first end, and second test signal is applied to the test circuit so as to cause the first and second buffers to apply a second set of voltage signals to the first and second conductors at the second end, and an output of the receiver is produced from the interaction of the first and second test signals applied to the first and second ends, and an impedance network made up of the first and/or second conductors, one or more line terminating resistors, output impedances of the first and second buffers, and output impedances of the first line driver. The output of the receiver can be interpreted based on the teachings of this invention to indicate opens in the first and second conductors, and/or shorts between one or more system supply voltages and at least one of the first and second conductors through the line driver.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Figure 1:
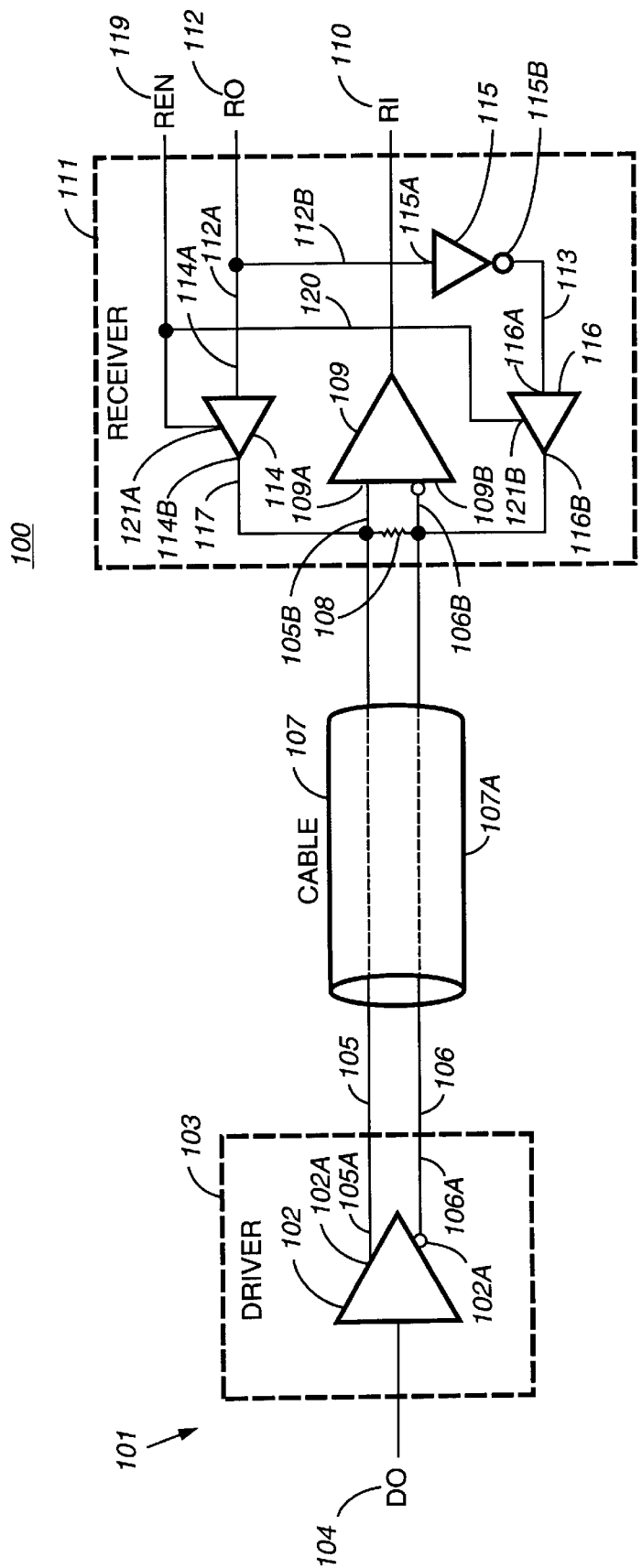
FIG. 1 is a schematic of a digital data transmission link incorporating a line test circuit according to a preferred embodiment of the invention.

Referring to FIG. 1 a schematic of a digital data transmission link incorporating a line test circuit according to a preferred embodiment of the present invention is shown. A driver 101, comprising a line driver-amplifier 102, is enclosed within a grounded shield 103. The driver-amplifier receives input binary data at input 104, and in response generates a non-inverted line drive signal, and an inverted line drive signal. The non-inverted line drive signal is applied to a first end 105A of a first conductor 105 of a shielded twisted pair line 107, and the inverted drive signal is applied to a first end 106A of a second conductor 106 of the shielded twisted pair line 107. Shield twisted pair line comprises a shield member 107A surrounding one or more twisted pairs of wires. In lieu of a twisted pair other types of signal lines may be used for example a stripline, microstrip, slotline, or coaxial line.

A receiver 100 is provided with a sheild case, 111. Within the case, a terminating inpedance 108, which preferably takes the form of a resistor, bridges from a second end 105B of the conductor 105 to a second end 106B of the second conductor 106. The resistor serves to terminate the twisted pair at its characteristic impedance of about 100 Ohms. The second end 105B of the first conductor 105 and the second end 106B of the second conductor are connected to a non inverting input 109A and inverting input 109B respectively, of the receiver amplifier-comparator 109. The receiver-comparator produces a binary output on output pin 110 in response to signals received via the two signal wirs 105, 106.

Also enclosed within the shield case 111 is a line test circuit. A test signal input 112 is connected to an input terminal 114A of a first auxiliary line driver (buffer) 114 by a first connection 112A, and an input terminal 115A of an inverter 115 through the first connection 112A and a second connection 112B. An output of the inverter 115B is connected to an input terminal 116A of a second auxiliary line driver (buffer) 116 by a third connection 113. An output terminal 114B of auxiliary line driver 114 is connected by a fourth connection 117 to the second end 105B of the first signal wire 105 of the twisted pair. An output terminal 116B of the second auxiliary line driver 116 is connected via a fifth connection 118 to the second end 106B of the second signal wire 106. The auxiliary line drivers 114,116 are of the three state logic type-having a high impedance (open) output state that is enabled by a high impedance control input pin. When the data link is in use for normal transmission of information signals the high impedance enable pin is set to the active state, and the test circuit does not adversely affect the terminating impedance of the signal line, and therefore does not degrade signals transmitted on the data link.

According a receiver high impedance control input 119 is provided. The high impedance control input is connected via a sixth connection 120 to high enable pins 121A, 121B of the auxiliary drivers 114, 116.

The first, second, third, fourth, fifth and sixth connection can be any device for conducting a signal. If it is an electrical conductor it may take the form of discrete wires in a prototype, metalization on a printed circuit board, or metalization in an ASIC chip implementation of the invention.

A detailed description of the operation of the test circuit is given below. A high level overview is now described. To begin, the high impedance enable input 119 is set to the inactive state, and combinations of different binary signals are applied to the data input 104, and the test signal input 112, and the receiver output on output pin 110 is obtained. The receiver output is interpreted in view of the data input and test signal input to diagnose various faults in the line driver-amplifier 102 and twisted pair line 107.

Figure 2:
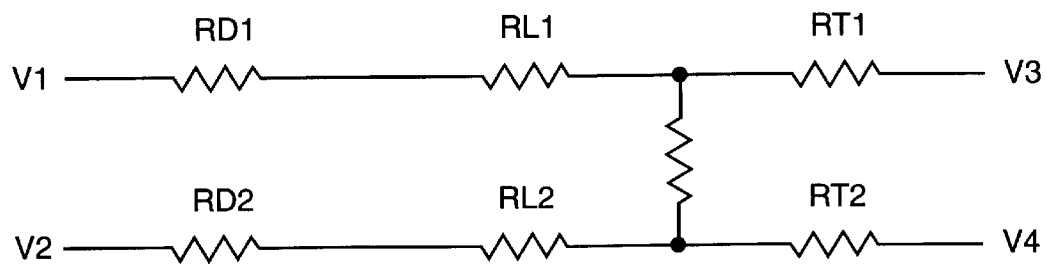
FIG. 2 is a Thevenin equivalent of the circuit shown in FIG. 1 with test signals applied

FIG. 2 shows a Thevenin equivalent of the circuit shown schematically in FIG. 1. In FIG. 2 the circuit has no faults. Referring to FIG. 2. The Tevenin equivalent, the line driver-amplifier 102 of FIG 1 is represented by two voltages, V1, V2 applied to two resistors RD1, RD2 which represent the output impedance of the driver-amplifier 102. The first voltage V1 is the voltage impressed at the non-inverting output 102A of the line driver amplifier, and the second voltage V2 is the voltage impressed at the inverting output 102B. Each of the output impedance resistors RD1, RD2 is connected to one of two resistors RL1, RL2 representing the DC impedance of the two signal conductors 105, 106 shown in FIG. 2, respectively. Series resistors RL1, RL2 are connected to opposite ends of a terminating resistor, RC (indicated by numeral 108 in FIG. 1) which connects the two signal lines, 105, 106. The auxiliary line drivers 114, 116 are represented by two more voltages V3, V4 applied to open ends of two reisitors RT1, RT2 representing their output impedance. The third voltage V3 represents the output of the first auxiliary line driver 114, while the fourth voltage V4 represents the output of the second auxiliary line driver 116. The resistors RT1, RT2 which represents the output impedance of the auxilary line drivers 114, 116 are connected across the terminating resistor RC. Considering that the voltage drop around a loop in a DC circuit must be 0, one obtains the following equations with reference to current path Ia, and Ib shown in FIG. 2 respectively.

$$(V1-V2)=Ia(RD1+RD2+RL1+RL2)+(Ia+Ib)RC \quad \text{EQU1}$$

$$(V3-V4)=Ib(RT1+RT2)+(Ia+Ib)RC \quad \text{EQU2}$$

In this embodiment, exemplary values are used for the equations, but it is understood to those skilled in the art that these are exemplary only. In performing the calculations the value of resistor RL1, RL2 which represent the ohmic loss or DC impedance of the line are set 5 to 10 Ohms as a representative value for twisted wire lines. The value of the resistors RD1, and RD2 which represent the output impedance of the line driver 102, are set to 20 Ohms. The value of the resistors RT1, RT2 which represent the output impedances of the auxiliary line drivers 114, 116 respectively are set to 200 Ohms.

Based on a logical 1 input at the input terminal 104, signal line driver 102 produces a voltage signal at its non-inverting output corresponding to voltage Vi in FIG. 2 of 1.75 Volts and a signal 0.75 Volts at its inverting output corresponding to voltage V2. For a logical 0 input signal the values are reversed. The auxiliary line drivers produce a larger voltage swing. For a logical 1 test signal input applied at the test signal input 112, auxiliary line drive 114 will set the third voltage signal V3 to 3.3 V and the second auxiliary line driver 116 will set the fourth voltage signal V4 to the lower rail voltage of 0.0 V. A logical 0 test signal input will result in the voltages V3, V4 being reversed to 0, and 3.3 for V3 and V4 respectively.

Permuting the logical values applied to signal line driver input 104, and the test signal input 112; setting the four voltages V1, V2, V3, V4 per the binary value of the inputs to the line driver input 4 and the test signal input 112, in accordance with the preceding paragraph and; calculating the value of the currents Ia, Ib by solving the two equations above, and calculating the voltage appearing across the terminating resistor RC based on the calculated currents Ia, Ib, yields a truth table characterizing a normal transmission line and receiver. The truth table is as follows.

TABLE 1

Normal Circuit Truth Table

| SIGNAL DRIVER | TEST DRIVER | OUTPUT VOLTAGE | LOGIC OUT |
|---|---|---|---|
| 0 | 0 | −0.869 | 0 |
| 0 | 1 | −0.362 | 0 |
| 1 | 0 | 0.362 | 1 |
| 1 | 1 | 0.869 | 1 |

In constructing the truth tables above and below, in accordance with the characteristics of the amplifier-comparator 109 which has as its input the voltage across the terminating resistor, a positive voltage value across the terminating resistor RC is taken as a logical 1, and a negative voltage value is taken as a logical 0. It is observed from the above table that a normal circuit with no opens in the signal wires 105,106 and no shorts in the signal driver 102, is characterized by output logic level that follows the signal driver regardless of the test driver value.

There are four permutations of the values of the signal driver input, and test driver input (0,0),(0,1),(1,0),and (1,1). In carrying out the testing method of the invention a sequence of sets of signal driver and test drive input would be applied sequentially to the circuit, The two values in each set, for the two inputs, being applied concurrently. The same order of the sequence would be used for each test so that the output obtained could be compared to known receiver output sequences corresponding to known circuit conditions, e.g. normal circuit, open conductor, etc. The output sequence constitutes a binary signature of the circuit condition.

Figure 3:
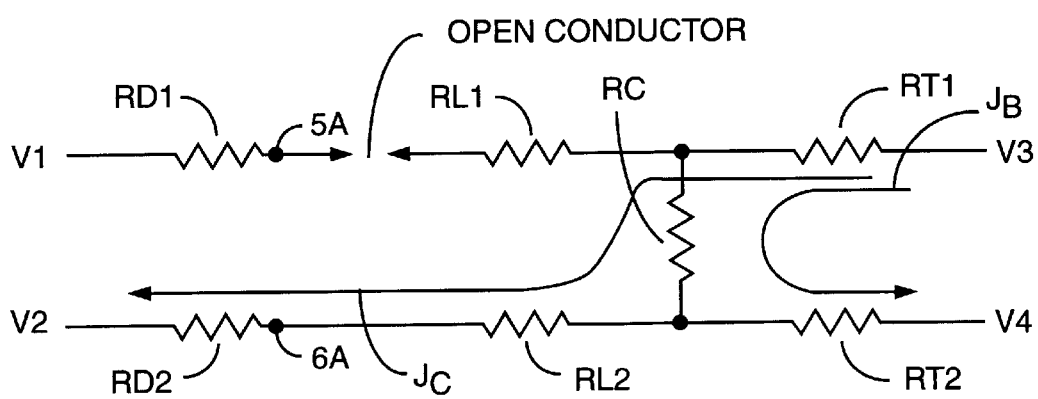
FIG. 3 is a Thevenin equivalent of the circuit shown in FIG. 1 with an open upper conductor, and test signals applied.

Referring to FIG. 3, a Thevenin equivalent circuit of a circuit with an open O in the upper signal conductor 105. Like parts are indicated by the same alphanumerics used in FIG. 2.

Another current path indicated as Ic in the drawing is considered along with current path Ib which was also shown in FIG. 2. Considering that the voltage drop around a loop in a DC circuit must be 0, one obtains the following equations with reference to current paths Ia, and Ic respectively.

$$(V3-V2)=Ib(RD2+RL2)+(Ib+Ic)(RT1+RC) \quad \text{EQU3}$$

$$(V3-V4)=(Ib+Ic)(RT1+RC)+Ib*RT2 \quad \text{EQU4}$$

Following the procedure discussed above with reference to FIG. 2 to obtain Table 1, the following truth table can be determined using equations EQU3, EQU4.

TABLE 2

Open Upper Signal Line Truth Table

| SIGNAL DRIVER | TEST DRIVER | OUTPUT VOLTAGE | LOGIC OUT |
|---|---|---|---|
| 0 | 0 | −0.597 | 0 |
| 0 | 1 | 0.541 | 1 |
| 1 | 0 | −0.321 | 0 |
| 1 | 1 | 0.817 | 1 |

The sequence of logic output values given in the last column of the table distinguish a circuit with an open upper line from a normal circuit. The ordered sequence is a of binary signature of a circuit with an open signal conductor.

Figure 4:
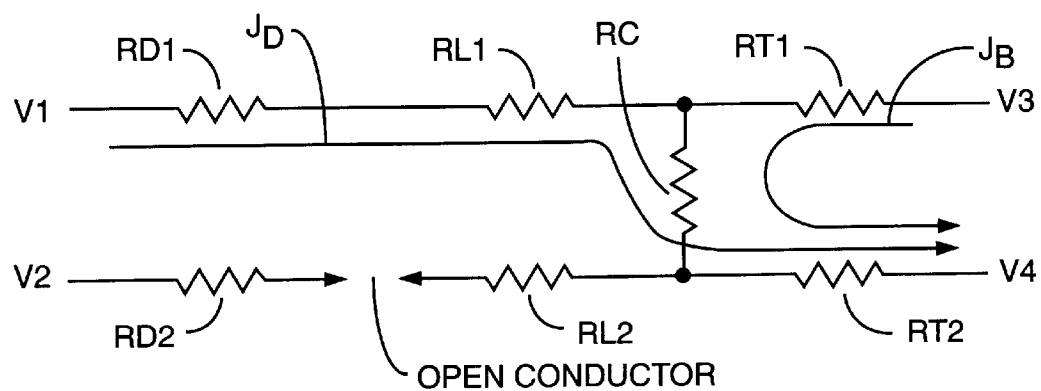
FIG. 4 is a Thevenin equivalent of the circuit shown in FIG. I with an open lower conductor, and test signals applied.

Referring to FIG. 4 a Thevenin equivalent of the circuit shown in FIG. 1, with an open O2 in the lower signal conductor, 106 is shown. The analysis of the circuit is done in similar manner to that above by considering the two illustrated current paths Ib and Id, on the basis of which the following equations are written.

$$(V1-V4)=Id(RD1+RL1)+(Ib+Id)(RC+RT2) \qquad \text{EQU5}$$

$$(V3-V4)=Ib*RT1+(Ib+Id)(RC+RT2) \qquad \text{EQU6}$$

Following the procedure discussed above with reference to FIG. 2 to obtain Table 1, the following truth table can be determined using equations EQU5, EQU6.

TABLE 3

Open Lower Signal Line Truth Table

| SIGNAL DRIVER | TEST DRIVER | OUTPUT VOLTAGE | LOGIC OUT |
|---|---|---|---|
| 0 | 0 | −0.817 | 0 |
| 0 | 1 | 0.321 | 1 |
| 1 | 0 | −0.541 | 0 |
| 1 | 1 | 0.596 | 1 |

As is shown from the table above, the sequence of binary outputs obtained resulting from permuting the signal driver input, 104 and the test signal input 112, is the same for either an open lower signal line or an open upper signal line. A faulty connection in the signal line can cause an excessive resistance in one or both of the signal lines. If the total series resistance added to the signal lines exceeds a certain value the binary outputs will be the same as for an open line. For this embodiment with the resistance values given above that value is about 70 Ohms. It is of course desirable that the excessive series resistance should also give a fault binary signature rather than a normal circuit binary signature.

A separate type of fault that is common in a digital data transmission link is a short in the line driver-amplifier, 102 from one of the voltage supply rails to one of the outputs. Shorts to the upper and lower line have binary signatures produced by employing the instant invention which distinguish circuits suffering from such a short from a normal circuit or a circuit having an open line.

In analyzing a circuit with a short between one of the supply rails (not shown in the figures, exemplary voltage values are taken as Vdd=3.3, and Vss=0.0), and the line driver outputs, FIG. 2, and equations 1 and 2 are applicable. for a short between the upper supply rail, Vdd and the upper signal conductor 105, through the line driver, V1 is set to Vdd=3.3 Volts. V2, V3, and V4 are set according to the signals applied to the binary data input 4 and the test signal input 112 as previously discussed. In solving the equations for the four permutation of logic values applied to data input 104 and test signal input 112 with V1 always set to Vdd=3.3 Volts, the following truth table is obtained which characterizes a aforementioned short:

TABLE 4

Short from Vdd to Upper Signal Conductor Truth Table

| SIGNAL DRIVER | TEST DRIVER | OUTPUT VOLTAGE | LOGIC OUT |
|---|---|---|---|
| 0 | 0 | 0.7.00 | 1 |
| 0 | 1 | 1.21 | 1 |
| 1 | 0 | 1.31 | 1 |
| 1 | 1 | 1.82 | 1 |

Likewise for a short between the lower supply rail Vss, and the lower signal conductor permuting the voltage value applied to V1, V3, and V4 as discussed above, while maintaining V2 at Vss=0 yields the following truth table:

TABLE 5

Short from Vss to Lower Signal Conductor Truth Table

| SIGNAL DRIVER | TEST DRIVER | OUTPUT VOLTAGE | LOGIC OUT |
|---|---|---|---|
| 0 | 0 | 0.207 | 1 |
| 0 | 1 | 0.715 | 1 |
| 1 | 0 | 0.823 | 1 |
| 1 | 1 | 1.33 | 1 |

A short from Vss to the upper signal conductor 105, gives the following truth table:

TABLE 6

Short from Vss to Upper Signal Conductor Truth Table

| SIGNAL DRIVER | TEST DRIVER | OUTPUT VOLTAGE | LOGIC OUT |
|---|---|---|---|
| 0 | 0 | −1.33 | 0 |
| 0 | 1 | −0.823 | 0 |
| 1 | 0 | −0.715 | 0 |
| 1 | 1 | −0.207 | 0 |

A short from Vdd to the lower signal conductor 106 yields the following truth table:

TABLE 7

Short from Vdd to Lower Signal Conductor Truth Table

| SIGNAL DRIVER | TEST DRIVER | OUTPUT VOLTAGE | LOGIC OUT |
|---|---|---|---|
| 0 | 0 | −1.82 | 0 |
| 0 | 1 | −1.31 | 0 |
| 1 | 0 | −1.21 | 0 |
| 1 | 1 | −0.7 | 0 |

In the case of shorts of either Vss, or Vdd to either of the signal conductors, if the output impedance of the line driver-amplifier are bypassed partially or completely the output voltages entered into the preceding four tables increase slightly in magnitude but the binary signatures (the last column of the tables) are unaltered.

According to the operation of the invention as described above the output of the amplifier-comparator is different in a normal circuit and a circuit with open conductors. In order that this difference in the output appear, the normal output impedance of the auxiliary line drivers 114, 116 (distinct from the impedance in the very high output impedance state which is used to isolate drivers 114,116 from the signal conductors 5,6) should be at least about four times, more preferably, at least about eight times the output impedance of driver-amplifier 102. The necessary value of the output resistance can be determined, for the above the embodiment described above by performing circuit analysis using the equations given above with reference to the Thevenin equivalents shown in the figures by setting the value of resistors RL1,RL2,RD1,RD2, and RC and varying the value of the resistors RT1, RT2 and determining the minimum value necessary to obtain distinct binary signatures for at least two circuit conditions or by an alternative procedure which one of ordinary skill in the art can determine. The high output impedance may be inherent to the auxiliary line drivers or may be provided by supplemental resistance to the output.

To summarize the results of the tables, binary signatures of a normal circuit, a circuit with an open signal line, either a circuit with a short between Vss and the lower signal conductor or Vdd and the upper signal conductor, and either a circuit with a short between Vdd and the upper signal conductor or Vss and the lower signal conductor, are distinct. Thus the incorporated test circuit provides diagnostic information on the digital data transmission link.

According to a preferred embodiment of the method of the invention, a digital data link incorporating a test circuit as depicted in FIG. 1, and described above is provided. A sequence of one or more first binary test signals is applied to line driver input 104, in synchronism with a sequence of one or more second binary test signals being applied to test signal input 112, such that one or more of all the possible permutations of first and second binary signals are applied to the digital link, and for each set of one first test signal applied to line driver input 104 and one second test signal applied to test signal input 112, an output of the amplifier-comparator 109 is obtained, such that a sequence of one or more output signals is obtained as a function of the first and the second test signals, the sequence values is compared to known binary signatures of one or more circuit conditions in order to diagnose the condition of the circuit.

A variety of driver-receiver chip sets are available off the shelf for digital signaling over multi-conductor signal lines. These chip sets use a variety of voltage levels and signal characteristics. The present invention will be applicable to a variety of chip-sets which may work somewhat differently than the signal link described above. Based on the teaching of the present specification one of ordinary skill in the art will be able to adopt the invention to a variety of different chip sets and signal lines.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A receiver test circuit for use with a differential data transmission link, the receiver test circuit comprising:

a receiver amplifier-comparator with
an input for a first conductor in a differential data transmission link;
an input for a second conductor in the differential data transmission link, with a resistance between the first conductor and the second signal;
whereby the input for the first conductor and the input for the second conductor are each driven by a three state line driver with a first output impedance, the line driver including an input, a first output connected to the first signal conductor and a second output connected to the second signal conductor forming a differential signal between the first signal conductor and the second signal conductor;
at least one auxiliary line driver, comprising:
an input; and
an output connected to the first conductor;
whereby the auxiliary line driver applies a signal through the output to the first conductor in response to a signal applied to the input of the auxiliary line driver.

2. The receiver test circuit according to claim 1, wherein the auxiliary line driver is a three-state logic type; wherein the three-state logic type further comprises:
a first output signal level;
a second output signal level;
a high impedance output state; and
a first control input for selecting the high impedance output state;
whereby the high impedance output state is selected by the first control input thereby effectively opening the connection between the auxiliary line driver and the first conductor so that the auxiliary line driver does not degrade a data signal on the data link during normal use.

3. The receiver test circuit according to claim 1, further comprising:
first auxiliary line driver comprising:
an input;
an oputput coupled to the first conductor; and
a second auxiliary line driver comprising:
an input;
an output coupled to the second conductor.

4. The receiver test circuit according to claim 3, wherein the first and the second auxiliary line drivers are three-state logic type, the first and the second auxiliary line driver further comprising:
a first output signal level;
a second output signal level;
a high impedance output state; and
a first control input for selecting the high impedance output state;
whereby the high impedance output state is selected to effectively open the connection between the auxiliary line driver and the first conductor so that the auxiliary line driver does not degrade data signals on the data link during normal use.

5. The receiver test circuit according to claim 3 comprising:
a test input;
an inverter with an input and an output;
a first connection coupling the test input and the input of the inverter;
a second connection coupling the output of the inverter and the input of the first auxiliary line driver; and a third connection coupling the test input and the input of the second auxiliary line driver;

whereby opposite signals appear at the first and the second auxiliary line drivers in response to a signal applied to the test input.

6. The receiver test circuit according to claim 5, wherein the first and second auxiliary line driver are a three-state logic type, the first and the second auxiliary line driver comprising:

a first output signal level;

a second output signal level;

a high imipedance output state; and a first control input for selecting the high impedance output state;

whereby the high impedance output state is selected to effectively open the connection between the auxiliary line driver and the first conductor so that the auxiliary line driver does not degrade data signals on the data link during normal use.

7. A test circuit for a data transmission link comprising:

a first signal conductor with a first end and a second end;

a second signal conductor with a first end and a second end, wherein there is a resistance between the first and second conductors;

a first line driver with a first output impedance, the first line driver comprising:
 an input;
 a first output;
 a second output;
  wherein, the first output is connected to the first end of the first signal conductor, and the second output is connected to the first end of the second signal conductor;

a receiver comprising a first input, a second input and an output, the first input being connected to the second end of the first signal conductor, and the second input being connected to the second end the second signal conductor comprising:

at least one auxiliary line driver having an output connected to one of the first and second signal conductors.

8. A test circuit according to claim 7 wherein the at least one auxiliary line driver has an output impedance which is at least about four times the first output impedance.

9. A test circuit according to claim 7 further comprising:

a first auxiliary line driver having an output coupled to the first signal conductor, and a second auxiliary line driver having an output coupled to the second signal conductor.

10. A test circuit according to claim 9 wherein the first and second auxiliary line drivers have an output impedance which is at least about four times the first output impedance.

11. A test circuit according to claim 9 wherein the first and second auxiliary line drivers have an output impedance which is at least about eight times the first output impedance.

12. A test circuit according to claim 9 further comprising:

a test signal input;

a first connection connecting the test signal input and the first auxiliary line driver;

a second connection;

an inverter, wherein the first connection and the second connection connect the test signal input to the inverter; and a third connection wherein the third connection connects the inverter to a the second auxiliary line driver.

13. A test circuit according to claim 12 wherein the first auxiliary line driver is connected to the second end of the first signal conductor and the second auxiliary line driver is connect to the second end of the second signal conductor.

14. A method of testing a differential data transmission link comprising:

connecting a first signal conductor of a differential data link to a first end of a resistor;

connecting a second signal conductor of the differential data link to a second end of the resistor;

connecting a first line driver with a first output impedance, the line driver including an input, a first output connected to the first signal conductor and a second output connected to the second signal conductor, connecting a receiver amplifier-comparator to the first signal conductor and the second signal conductor;

placing a high output impedance second line driver with a first input, a control input and a high impedance output, the second line driver capable of applying one or more signals through the high impedance output to the first end of the resistor;

applying a first signal of a preselected value to the first input of the second line driver;

applying a second signal of a preselected value to the control input concurrently with applying the first signal;

receiving an output from the receiver; and comparing the output of the receiver to known values indicating a normal line or one or more line faults.

15. A method of testing a data transmission link comprising steps of:

providing a data link comprising a first conductor with a first end and a second end and a second conductor with a first end and a second end, coupling a resistance between the first conductor and the second conductor;

providing a line driver capable of applying either a first voltage at:
 (i) a first output and a second voltage at a second output in response to a first value of a first test signal; or
 (ii) a second output and a second voltage at a first output in response to a second value of a first test signal;

coupling the first output to the first end of the first conductor;

coupling the second output to the first end of the second conductor;

providing a second line driver capable of concurrently, applying either:
 (i) a third voltage to the second end of the first conductor and a fourth voltage to the second end of the second conductor in response to a first value of a second test signal;

(ii) a fourth voltage to the second end of the first conductor and a third voltage to the second end of the second conductor in response to a second value of the second test signal;

coupling the second line driver to the second end of the first conductor and the second end of the second conductor;

providing a receiver capable of detecting a fifth voltage at a first receiver input;

providing a sixth voltage at a second receiver input, and producing an output in response to the detected fifth and sixth voltages;

coupling the first receiver input to the second end of the first signal conductor, coupling the second receiver input to the second end of the second signal conductor;

applying a predetermined sequence of one or more permutations of sets of values of the first test signal concurrently and the second test signals;

obtaining a sequence of output values from the receiver, comparing the sequence of output values to one or more known sequences.

* * * * *

UNITED STATES PATENT AND TRADEMARK OFFICE
CERTIFICATE OF CORRECTION

PATENT NO. : 6,373,262 B1
DATED : April 16, 2002
INVENTOR(S) : Herring et al.

It is certified that error appears in the above-identified patent and that said Letters Patent is hereby corrected as shown below:

Column 2,
Line 2, from "connected" to -- connect --

Column 3,
Line 25, from "put set" to -- set --

Column 4,
Line 30, from "inpedance" to -- impedance --
Line 40, from "wirs" to -- wires --
Line 62, from "According" to -- Accordingly --

Column 5,
Line 57, from "Vi" to -- V1 --
Line 62, from "drive" to -- driver --

Column 7,
Line 13, from "distinguish" to -- distinguishes --
Line 15, from "is a of" to -- is a --
Line 64, from "for a short" to (NEW PARAGRAPH) -- For a short --

Column 8,
Line 5, from "a" to -- an --

Column 10,
Line 6, from "signal" to -- conductor --
Line 37, from "first auxiliary" to -- a first auxiliary --

UNITED STATES PATENT AND TRADEMARK OFFICE
CERTIFICATE OF CORRECTION

PATENT NO. : 6,373,262 B1
DATED : April 16, 2002
INVENTOR(S) : Herring et al.

It is certified that error appears in the above-identified patent and that said Letters Patent is hereby corrected as shown below:

<u>Column 12,</u>
Line 5, from "to a the" to -- to the --
Line 9, from "connect" to -- connected --

Signed and Sealed this

Third Day of September, 2002

*Attest:*

*Attesting Officer*

JAMES E. ROGAN
*Director of the United States Patent and Trademark Office*